United States Patent
Belfy et al.

(10) Patent No.: US 10,484,403 B2
(45) Date of Patent: Nov. 19, 2019

(54) AVIONIC EQUIPMENT WITH SINGLE USE SIGNING OF A TRANSMITTED MESSAGE AND ASSOCIATED AVIONIC SYSTEM, TRANSMISSION METHOD AND COMPUTER PROGRAM

(71) Applicant: Thales, Courbevoie (FR)

(72) Inventors: Henri Belfy, Toulouse (FR); Vincent Tainturier, Toulouse (FR); Jean-Arnaud Causse, Toulouse (FR)

(73) Assignee: THALES, Courbevoie (FR)

( * ) Notice: Subject to any disclaimer, the term of this patent is extended or adjusted under 35 U.S.C. 154(b) by 176 days.

(21) Appl. No.: 15/787,941

(22) Filed: Oct. 19, 2017

(65) Prior Publication Data
US 2018/0124075 A1    May 3, 2018

(30) Foreign Application Priority Data
Oct. 27, 2016  (FR) ..................... 16 01554

(51) Int. Cl.
*H04L 29/06*  (2006.01)
*H04L 9/06*  (2006.01)
(Continued)

(52) U.S. Cl.
CPC ........ *H04L 63/1416* (2013.01); *H04L 9/0643* (2013.01); *H04L 9/3247* (2013.01);
(Continued)

(58) Field of Classification Search
CPC ........... H04L 63/1416; H04L 12/40019; H04L 9/0643; H04L 63/123; H04L 9/3247; H04L 67/12; H04L 2012/4028; H04W 12/10
See application file for complete search history.

(56) References Cited

U.S. PATENT DOCUMENTS 4,467,139 A * 8/1984 Mollier ............... G06Q 20/341
380/22
6,826,690 B1 * 11/2004 Hind .................... G06F 21/31
713/173

(Continued)

FOREIGN PATENT DOCUMENTS

FR   2871012 A1   12/2005
FR   2933557 A1   1/2010

(Continued)

OTHER PUBLICATIONS

Fleischman et al., "DOT/FAA/AR-08/31 Networked Local Area Networks in Aircraft: Safety, Security, and Certification Issues, and Initial Acceptance Criteria (Phases 1 and 2)", Nov. 2008, US Department of Transportation—Federal Aviation Administration.

*Primary Examiner* — J. Brant Murphy
(74) *Attorney, Agent, or Firm* — Soquel Group LLC

(57) ABSTRACT

An avionic equipment unit, intended to be on board an aircraft, including a calculating module configured to calculate a signature associated with a data field, the calculated signature depending on the data field, and a transmission module configured to transmit a message to another avionic equipment unit on board the aircraft, the message including the data field and the associated calculated signature, the calculated signature being unique for each data field and for each respective message transmission.

10 Claims, 2 Drawing Sheets

(51) Int. Cl.
  *H04L 9/32*   (2006.01)
  *H04W 12/10*  (2009.01)
  *H04L 12/40*  (2006.01)
  *H04L 29/08*  (2006.01)

(52) U.S. Cl.
  CPC ...... *H04L 12/40019* (2013.01); *H04L 63/123* (2013.01); *H04W 12/10* (2013.01); *H04L 67/12* (2013.01); *H04L 2012/4028* (2013.01)

(56) References Cited

U.S. PATENT DOCUMENTS

| | | | | |
|---|---|---|---|---|
| 7,707,415 | B2 * | 4/2010 | Braskich | H04L 63/0892 380/270 |
| 9,713,992 | B2 * | 7/2017 | Toillon | H04L 1/0061 |
| 2006/0080451 | A1 * | 4/2006 | Eckert | G06F 9/544 709/230 |
| 2006/0095764 | A1 * | 5/2006 | Suanez | H04L 9/3247 713/168 |
| 2008/0063205 | A1 * | 3/2008 | Braskich | H04L 63/0892 380/270 |
| 2008/0130895 | A1 * | 6/2008 | Jueneman | H04L 9/3066 380/277 |
| 2010/0100745 | A1 * | 4/2010 | Belmonte | H04L 63/123 713/176 |
| 2010/0188831 | A1 * | 7/2010 | Ortet | H05K 7/1412 361/788 |
| 2012/0036445 | A1 * | 2/2012 | Ganille | G06F 11/0739 715/738 |
| 2012/0072482 | A1 * | 3/2012 | Causse | H04L 12/1863 709/203 |
| 2012/0216043 | A1 * | 8/2012 | Le Cam | G08B 13/19656 713/176 |
| 2013/0028174 | A1 * | 1/2013 | Cabos | H04L 51/063 370/316 |
| 2014/0379817 | A1 * | 12/2014 | Logue | G06Q 10/107 709/206 |
| 2016/0347267 | A1 * | 12/2016 | Toillon | H04L 1/0061 |
| 2017/0295031 | A1 * | 10/2017 | Bush | H04L 43/08 |

FOREIGN PATENT DOCUMENTS

| | | | | |
|---|---|---|---|---|
| FR | 3014273 | A1 * | 6/2015 | ........... H04L 1/0061 |
| FR | 3014273 | A1 | 6/2015 | |

* cited by examiner

AVIONIC EQUIPMENT WITH SINGLE USE SIGNING OF A TRANSMITTED MESSAGE AND ASSOCIATED AVIONIC SYSTEM, TRANSMISSION METHOD AND COMPUTER PROGRAM

CROSS-REFERENCE TO RELATED APPLICATIONS

This application is based upon and claims the benefit of priority of the prior French Patent Application No. FR 16 01554, filed on Oct. 27, 2016, the entire contents of which are incorporated herein by reference.

FIELD OF THE INVENTION

The present invention relates to an avionic equipment unit, intended to be on board an aircraft. The avionic equipment unit comprises a calculating module configured to calculate a signature associated with a data field, the calculated signature depending on the data field; and a transmission module configured to transmit a message to another avionic equipment unit on board the aircraft, the message including the data field and the associated calculated signature.

The invention also relates to an avionic system comprising at least two avionic equipment units connected to one another by a communication link, including such an avionic equipment unit.

The invention also relates to a method for transmitting a message using such an avionic equipment unit on board the aircraft.

The invention also relates to a non-transitory computer-readable medium including a computer program including software instructions which, when executed by a computer, implement such a transmission method.

The invention relates to the field of secure communications on board an aircraft, in particular the protection of messages, particularly so as to limit the risk of injection, by unauthorized or malicious equipment, of data into a message exchanged between two avionic equipment units on board the aircraft.

The invention then more particularly relates to the field of avionic communication equipment units, installed onboard aircraft, which are then preferably according to standard ARINC 664.

BACKGROUND

An avionic equipment unit of the aforementioned type is known from document FR 2 933 557 A1. This document describes a mechanism for protecting the integrity of data transmitted over a network using the AFDX technology in the aeronautic field. A detection of an absence of alteration of the data transmitted between transmitting equipment and receiving equipment is done via a cyclic redundancy check (CRC).

The transmitting equipment then encodes the data to be transmitted, by implementing a predefined rule, the calculated code for example being based on a particular CRC, different from the CRC according to standard IEEE 802.3. The transmitting equipment then associates the calculated code with the data, and transmits, to the receiving equipment, a message including the data and the associated calculated code, the code being an integrity code associated with the data. The receiving equipment then implements said predefined rule on the received data and verifies whether the integrity code thus obtained is equal to the integrity code included in the received message, a difference between these two integrity codes indicating the presence of an alteration of the transmitted data.

Document FR 2 871 012 B1 also describes the use of a cyclic redundancy check in the context of loading applications toward servers on board an airborne means of transportation. A sent message then comprises a secure header including an integrity check field for the data contained in the secure header, for example in the form of a cyclic redundancy code (CRC), calculated from a list of files present in a corresponding part of the header. The integrity check field then allows the recipient of the secure header to verify that the data received in this header indeed complies with what was sent.

However, the protection of the transmitted data is not optimal with such an avionic equipment unit.

SUMMARY

The aim of the invention is then to propose an avionic equipment unit, and a related method, making it possible to improve the protection of a data field included in a message transmitted to another avionic equipment unit.

To that end, the invention relates to an avionic equipment unit of the aforementioned type, wherein the calculated signature is unique for each data field and for each respective message transmission.

With the avionic equipment unit according to the invention, the calculated signature is then unique for each message transmission, including when two successive transmissions of a same data field are done, in which case the calculated signature differs from one transmission to the other of the same data field. The avionic equipment unit according to the invention then makes it possible to protect the data field of the message via a single-use signature.

With the avionic equipment unit of the state of the art, the calculated signature does not vary from one transmission to the other of the same data field. The calculated signature is, in other words, unique only for the corresponding data field, but is not unique for each data field and for each respective message transmission.

The avionic equipment unit of the state of the art then essentially offers protection against a random event leading to corruption of the transmitted data, but does not effectively protect against an intentional modification of the transmitted data resulting from a malicious attack. Indeed, the code calculated with the avionic equipment unit of the state of the art is generally easy to recalculate, and does not need to be modified from one transmission to the next of the same data. Such an intentional modification of the data may then not be detected with the avionic equipment unit of the state of the art.

On the contrary, with the avionic equipment unit according to the invention, the calculated signature is unique for each data field and for each respective message transmission, and is then intended for a single use, which greatly reduces the risk of non-detection of such an intentional modification of the data following a malevolent attack.

According to other advantageous aspects of the invention, the avionic equipment unit comprises one or more of the following features, considered alone or according to any technically possible combinations:

- the calculating module is configured to calculate the signature further as a function of a preceding signature associated with the data field of the last message transmitted by the transmission module;

when the signature to be calculated corresponds to a first message to be transmitted, the preceding signature is formed by a hazard;

the hazard is obtained from a pseudo-random algorithm and a physical entropy source;

the hazard depends on a value of the clock of a computer calculating said hazard, preferably a time instant of the first execution by said computer of a software application configured to calculate said hazard, the calculating module is configured to calculate the signature further as a function of a private key, the private key being known by the other avionic equipment unit for which the message is intended; and the avionic equipment unit according to standard ARINC 664, and the transmission module is configured to transmit a message corresponding to a protocol according to standard ARINC 664.

The invention also relates to an avionic system comprising at least two avionic equipment units connected to one another by a communication link, in which one avionic equipment unit is as defined above, and in which another avionic equipment unit comprises a receiving module configured to receive the message including the data field and the associated signature, and a verification module configured to verify the consistency between the data field and the associated signature.

The invention also relates to a method for transmitting a message via an avionic equipment unit, intended to be on board an aircraft, the method comprising:

calculating a signature associated with a data field, the calculated signature depending on the data field, and transmitting a message to another avionic equipment unit on board the aircraft, the message including the data field and the associated calculated signature, wherein the calculated signature is unique for each data field and for each respective message transmission.

The invention also relates to a non-transitory computer-readable medium including a computer program including software instructions which, when executed by a computer, implement a method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
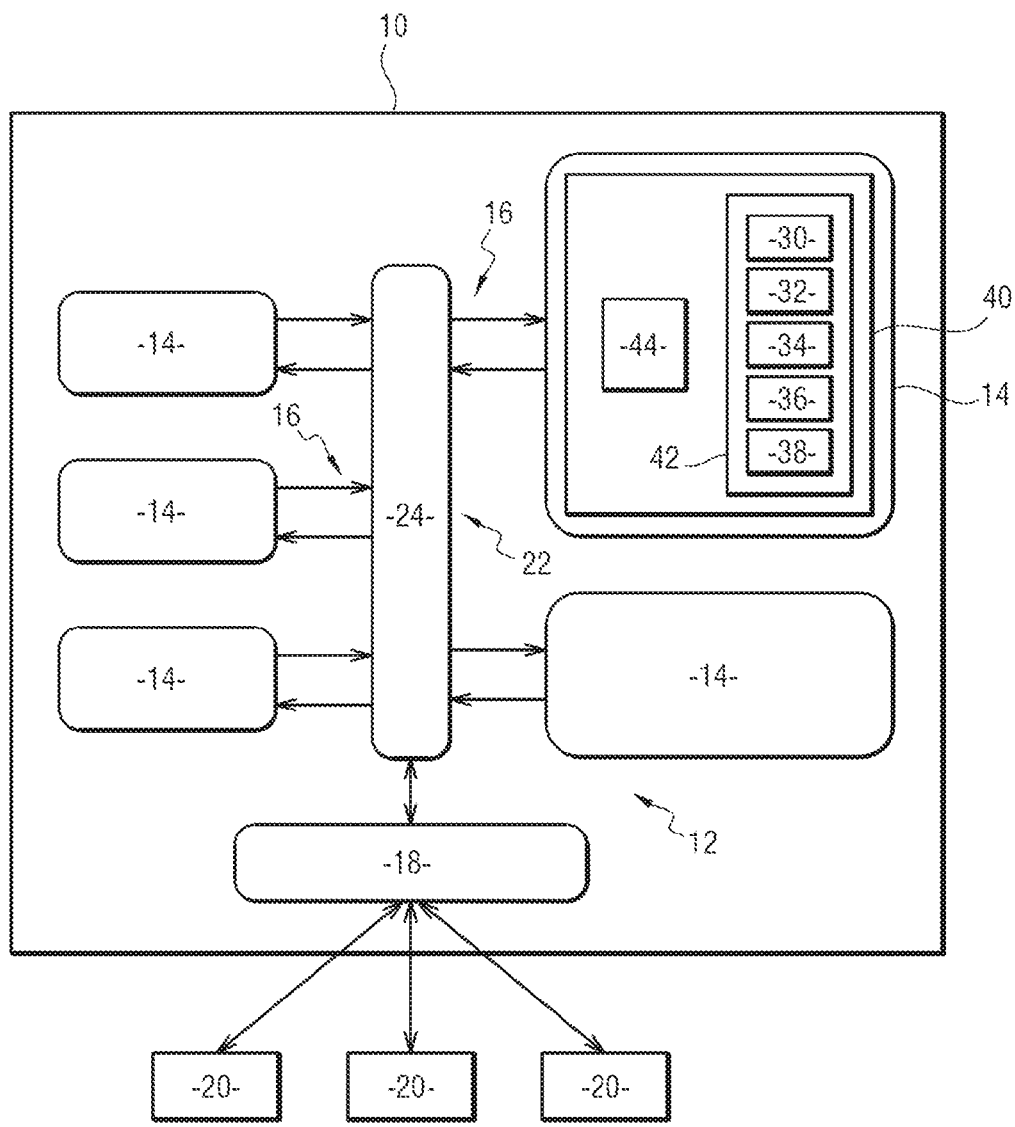
FIG. 1 is a schematic illustration of an aircraft equipped with an avionic system according to the invention comprising at least two avionic equipment units connected to one another by a communication link.

In FIG. 1, an aircraft 10 comprises an avionic system 12 including at least two avionic equipment units 14 connected to one another by a communication link 16.

The aircraft 10 also comprises a firewall 18, i.e., an electronic device forming a computer security barrier, the firewall 18 being configured to filter data streams coming from outside electronic equipment units 20 arranged outside the aircraft 10, these outside equipment units 20 for example being stations on the ground.

The aircraft 10 is preferably an airplane. Alternatively, the aircraft 10 is a helicopter, or a drone piloted remotely by a pilot.

The avionic system 12 includes several avionic equipment units 14. The avionic system 12 further for example includes a communication network 22 interconnecting the avionic equipment units 14, the communication network 22 including a network switch 24 connected to the various avionic equipment units 14. The communication network 22 then forms the communication link(s) 16 connecting the avionic equipment units 14 to one another.

In the example of FIG. 1, a single avionic equipment unit 14 is shown in detail with the different modules that it contains, in order to simplify the drawing.

At least one avionic equipment unit 14 comprises a calculating module 30 configured to calculate a signature associated with a data field, and a transmission module 32 configured to transmit a message to another avionic equipment unit 14, the message including the data field and the associated calculated signature.

At least one other avionic equipment unit 14 comprises a receiving module 34 configured to receive the message including the data field and the associated signature, and a verification module 36 configured to verify the consistency between the data field and the associated signature.

Each avionic equipment unit 14 is preferably configured both to transmit messages to other avionic equipment unit(s) 14 and to receive messages from other avionic equipment unit(s) 14. Each avionic equipment unit 14 then preferably comprises the calculating module 30, the transmission module 32, the receiving module 34 and the verification module 36.

One skilled in the art will of course understand that an avionic equipment unit 14 that is only intended to transmit messages and not to receive them will then include the calculating module 30 and the transmission module 32, but not the receiving module or the verification module. Conversely, an avionic equipment unit 14 that is only intended to receive messages from other avionic equipment unit(s) 14 will then include the receiving module 34 and the verification module 36, but not the calculating module or the transmission module.

Each avionic equipment unit 14 is preferably according to standard ARINC 664. In particular, the transmission module 32 is configured to transmit a corresponding message according to a protocol compliant with standard ARINC 664, and the receiving module 34 is also configured to receive a message according to the protocol compliant with standard ARINC 664.

Each avionic equipment unit 14 further comprises a set 38 of private keys, for example used to calculate the signature and/or to verify the consistency between the data field and the signature.

In the example of FIG. 1, each avionic equipment unit 14 comprises an information processing unit 40, for example made up of a memory 42 associated with a processor 44.

The communication network 22 is preferably according to standard ARINC 664, and the network switch 24 is then also according to standard ARINC 664.

The communication network 22 is for example an AFDX (Avionics Full DupleX switched ethernet) network with one or several network switch(es) 24 according to standard ARINC 664. Each network switch 24 is known per se, and includes several communication ports, also called connection ports, each communication port being able to be connected to a corresponding avionic equipment unit 14.

Each network switch 24 is for example an Ethernet switch. In the example of FIG. 1, the calculating module 30, the transmission module 32, the receiving module 34 and the verification module 36 are each made in the form of a software executable by the processor 44. The memory 42 of the avionic equipment unit 14 is then able to store a calculating software configured to calculate the signature associated with the corresponding data field, a transmission software configured to transmit the message to the other avionic unit 14, the message including the data field and the associated calculated signature, a receiving software configured to receive the message including the data field and the associated signature, and a verification software configured to verify the consistency between the data field and the associated signature.

The processor 44 of the information processing unit 40 is then able to execute the calculating software and the transmission software when the corresponding avionic equipment unit 14 transmits the message to another avionic equipment unit 14, or to execute the receiving software and the verification software when the avionic equipment unit 14 receives the message sent by another avionic equipment unit 14.

In an alternative that is not shown, the calculating module 30, the transmission module 32, the receiving module 34 and the verification module 36 are each made in the form of a programmable logic component, such as a FPGA (Field Programmable Gate Array), or in the form of a dedicated integrated circuit, such as an ASIC (Applications Specific Integrated Circuit).

A data field refers to any field of a message, containing data able to be taken into account by a receiving avionic equipment unit 14, in particular whether involving a field of the header or the main body of the message.

The calculating module 30 is configured to calculate the signature associated with a data field, this calculating signature next being included with the data field and the message sent to the receiving avionic equipment unit 14 and allowing the verification by said receiving avionic equipment unit 14 of the consistency between the data field and the associated signature. In case of inconsistency, the receiving avionic equipment unit 14 then deduces from this that the received data field does not correspond to the data field sent by the transmitting avionic equipment unit 14, and then does not take the received data field into account. The signature is also called a code.

The calculating module 30 is then configured to calculate the signature as a function of the data field, i.e., as a function of the data contained in said field. According to the invention, the calculated signature is unique both for each data field and for each respective message transmission. In other words, the calculated signature is intended for a single use, and will vary, for a same data field, from one transmission to another of the message containing this same data field.

The calculating module 30 is then configured to calculate the signature such that it is unique both for each data field and for each respective message transmission.

The calculating module 30 is for example configured to calculate the signature as a function of the data field, and further of a preceding signature, the latter being associated with the data field of the last message transmitted by the transmission module 32 of this avionic equipment unit.

As an optional addition, the calculating module 30 is configured to calculate the signature further as a function of a private key, the private key being known by the other avionic equipment unit 14 for which the message is intended.

The private key is for example contained in the set of private keys 38, stored in each of the two avionic equipment units 14, i.e., the transmitting avionic equipment unit 14 and the receiving avionic equipment unit 14.

As another optional addition, the calculating module 30 is configured to calculate the signature by applying a hash function to the different elements on which it depends, such as the data field, the preceding signature, or even the private key.

The calculated signature then for example verifies the following equation:

$$\text{Signature\_Msg}(n)=\text{Algo\_Hash\_Secure [Signature\_Msg}(n\text{-}1), \text{Request}(n), \text{Secret key}]$$

where Signature_Msg(n) designates the calculated signature;

Algo_Hash_Secure designates the hash function;

Signature_Msg(n-1) designates the preceding signature, associated with the data field of the last transmitted message;

Request(n) designates the data field for which the signature is calculated; and

Secret key designates the secret private key, known both by the transmitting avionic equipment unit 14 and the receiving avionic equipment unit 14.

The hash function is a signature calculation algorithm, such as the HMAC-SHA-256/512 algorithm. The hash function is for example a cryptographic hash function.

When calculating the signature, the data field and the preceding signature are preferably numerically concatenated to form a base datum on which the hash function is applied, with, as security parameter, the private key contained in the transmitting and receiving avionic equipment units 14.

When the signature to be calculated corresponds to a first message to be transmitted, no preceding signature has been calculated yet, and a hazard is then taken into account as preceding signature. In other words, when the signature to be calculated corresponds to a first message to be transmitted, the preceding signature is formed by a value of the hazard, also called pseudo-random seed.

The value of the hazard is for example stored in the memory 42 of the avionic equipment unit 14, prior to message transmission.

Alternatively, the value of the hazard is calculated by the calculating module 30. The value of the hazard is then for example obtained from a pseudo-random algorithm and a physical entropy source. The physical entropy source is for example a computer onboard the aircraft 10. The hazard then for example assumes a value of the clock of this computer able to calculate said value of the hazard, preferably a time instant of the first execution by said computer of a software application configured to calculate said value of the hazard.

According to this alternative, the value of the hazard is different each time the corresponding avionic equipment unit 14 is initialized and is also different from one avionic equipment unit 14 to the other.

When the initial value of the hazard depends on the time instant of the first execution by the computer of the software application for calculating the hazard, the value taken into account is for example the duration between the startup moment of the computer and the time instant of this first execution, this duration preferably being expressed in microseconds. Furthermore, the execution, by the computer, of the software application for calculating the hazard resulting from a manual action performed by an operator, the value thus obtained is satisfactory to provide a hazard usable as entropy source in order to calculate the first signature for this avionic equipment unit 14.

When the hazard must be recalculated during a future initialization, the update of the hazard is for example done by applying the hash function to a numerical concatenation of the last calculated value of the hazard and a property associated with the physical entropy source. The property associated with the physical entropy source is for example the current time of the computer performing the update of the hazard.

This new value of the hazard calculated during a new initialization of the avionic equipment unit then replaces the previous calculated value of the hazard, and is stored in place of this previous calculated value in the memory 42.

Alternatively, the calculating module 30 is configured to calculate the signature by applying an algorithm, such as a cryptographic algorithm, to the data field with a secret code, the secret code being known only by the transmitting and receiving avionic equipment units 14. The secret code further has a short temporal validity, for example with a validity duration of less than one minute. The secret code is for example obtained from a synchronization clock shared by the transmitting and receiving avionic equipment units 14. The algorithm is known from the transmitting and receiving avionic equipment units 14.

Figure 2:
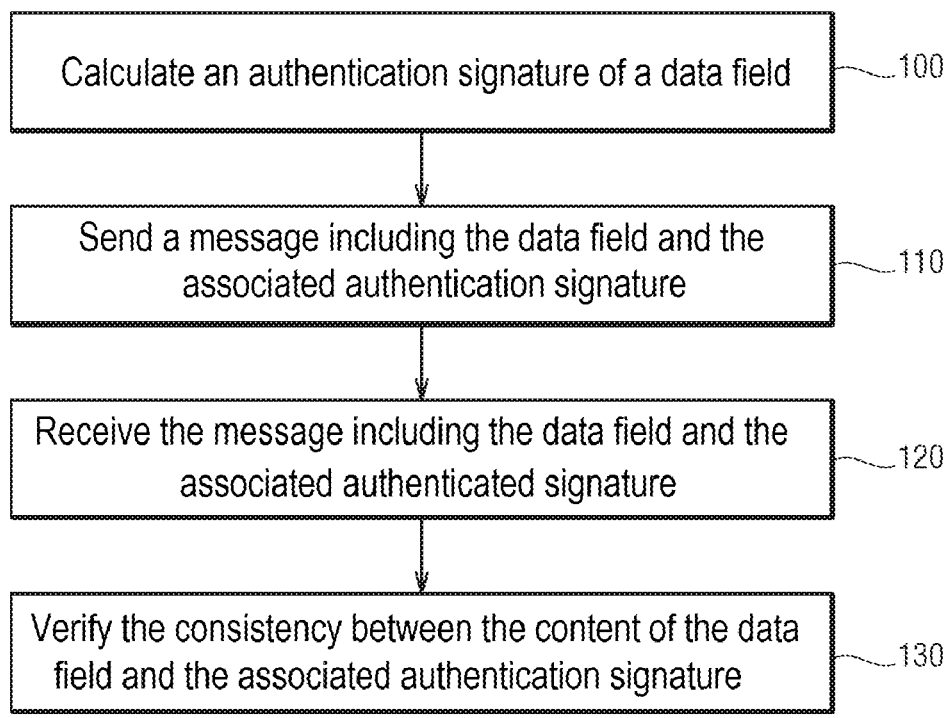
FIG. 2 is a flowchart of a method for transmitting, according to the invention, a message within the avionic system of FIG. 1, via an avionic equipment unit, intended for another avionic equipment unit.

The operation of the avionic equipment unit 14 according to the invention will now be explained using FIG. 2, showing a flowchart of the method according to the invention, for transmitting a message from an avionic equipment unit 14 intended for another avionic equipment unit 14, both being on board the aircraft 10.

During an initial step 100, the avionic equipment unit 14 begins by calculating, using its calculating module 30, the signature corresponding to the data field that the transmitting avionic equipment unit 14 wishes to transmit to the other avionic equipment unit 14, i.e., the receiving avionic equipment unit 14.

As previously indicated and according to the invention, the calculated signature is unique both for each data field and for each respective message transmission. In other words, the calculated signature is a single-use signature for each data field, and is not replayable, even in the case where the message transmitted by the avionic equipment unit 14 to the other avionic equipment unit 14 is intercepted and recorded.

The transmitting avionic equipment unit 14 next transmits, during the following step 110, the message in particular including the data field and the associated signal, to the other avionic equipment unit 14, i.e., to the receiving avionic equipment unit 14.

During step 120, the receiving avionic equipment unit 14 then receives, via its receiving module 34, the message transmitted by the transmitting avionic equipment unit 14. The received message includes the data field and the associated calculated signature.

The receiving avionic equipment unit 14 lastly verifies, during step 130, the consistency between the content of the data field included in the received message and the associated signature. For this consistency verification, the verification module 36 of the receiving avionic equipment unit 14 then recalculates the signature for the data field included in the received message, identically to the calculation done by the calculating module 30 during the initial step 100 within the transmitting avionic equipment unit 14.

If the signature recalculated by the verification module 36 is identical to the signature included in the received message, then the verification module 36 confirms the consistency between the data field and the associated signature, and the data contained in the data field are then taken into account by the receiving avionic equipment unit 14. Indeed, this identity between the recalculated signature and the signature included in the received message is an indication, for the receiving avionic equipment unit 14, of the authenticity of the transmitting avionic equipment unit 14 and the integrity of the data field included in the received message, as well as the absence of a replay of the signature for malevolent purposes.

Otherwise, when the signature recalculated by the verification module 36 is different from the signature included in the received message, then the verification module 36 deduces from this that the data field included in the received message is different from the data field initially sent by the transmitting avionic equipment unit 14 or that the identity of the transmitting avionic equipment unit 14 was usurped during a malevolent attack, and the data included in this data field are then not taken into account by the receiving avionic equipment unit 14. This difference between the data field included in the received message and the data field initially transmitted by the transmitting avionic equipment unit can result from a periodic transmission defect on the communication link 16 between the transmitting avionic equipment unit 14 and the receiving avionic equipment unit 14, or a malevolent attack on this message transmission.

As an optional addition, the verification module 36 is further configured to generate an alert message if a difference is detected between the signature included in a received message and the recalculated signature, in particular when the number of such errors is above a predefined threshold.

The avionic equipment unit 14 and the transmission method according to the invention then make it possible to improve the protection of the data field included in the transmitted message, by using a signature of the data field that is unique for each data field and for each respective message transmission.

In other words, each calculated signature for each data field to be transmitted is a single-use signature, i.e., it is a signature intended to be used only for this data field and for said considered transmission. Furthermore, this signature is not replayable, since even for an identical data field from one message transmission to another, the calculated signature will vary, the latter being unique for each data field and for each respective message transmission.

Calculating the current signature as a function of the previous signature then makes it possible to obtain the aforementioned uniqueness simply, and one skilled in the art will understand that other calculating algorithms to obtain this uniqueness can be considered, in particular that with the secret code known only by the transmitting and receiving avionic equipment units 14, and which has a short temporal validity, the algorithm further being known by the transmitting and receiving avionic equipment units 14. This also allows authentication of the transmitting avionic equipment unit 14 with respect to the receiving avionic equipment unit 14.

Thus, the use of a single-use signature, i.e., unique for each data field and for each respective message transmission, then makes it possible to prevent a same data field from being able to be signed twice with the same signature, which would cause a risk of corruption of the data field in case of interception of the message by a malevolent action.

One can thus see that the avionic equipment unit and the associated transmission method make it possible to improve the protection of data transmitted within the avionic system 12 according to the invention.

The invention claimed is:

1. An avionic equipment unit, intended to be on board an aircraft, the avionic equipment unit comprising:
   a processor for calculating a signature associated with a data field, the calculated signature depending on the data field; and
   a transmitter configured to transmit a message to another avionic equipment unit on board the aircraft, the message including the data field and the associated signature calculated by said processor,
wherein the calculated signature further depends on a preceding signature associated with the data field of a last message transmitted by said transmitter, such that the calculated signature is unique for each data field and for each message transmitted by said transmitter.

2. The avionic equipment unit according to claim 1, wherein, when the signature to be calculated corresponds to a first message to be transmitted, the preceding signature is formed by a hazard.

3. The avionic equipment unit according to claim 2, wherein the hazard is obtained from a pseudo-random algorithm and a physical entropy source.

4. The avionic equipment unit according to claim 3, wherein the hazard depends on a value of the clock of a computer calculating the hazard.

5. The avionic equipment unit according to claim 4, wherein the value of the clock is a time instant of the first execution by the computer of a software application configured to calculate said hazard.

6. The avionic equipment unit according to claim 1, wherein said processor calculates the signature further as a function of a private key, the private key being known by the other avionic equipment unit for which the message is intended.

7. The avionic equipment unit according to claim 1, wherein the avionic equipment unit complies with standard ARINC 664, and said transmitter transmits a message corresponding to a protocol according to standard ARINC 664.

8. An avionic system comprising at least two avionic equipment units connected to one another by a communication link, wherein at least one of said avionic equipment units is according to claim 1, and wherein at least one other of said avionic equipment units comprises:
   a receiver receiving the transmitted message including the data field and the associated calculated signature; and
   a verifier verifying consistency between the data field and the associated calculated signature.

9. A method for transmitting a message via an avionic equipment unit, intended to be on board an aircraft, the method comprising:
   calculating a signature associated with a data field, the calculated signature depending on the data field; and
   transmitting a message to another avionic equipment unit on board the aircraft, the message including the data field and the associated calculated signature,
wherein the calculated signature further depends on a preceding signature associated with the data field of a last message transmitted by said transmitting, such that the calculated signature is unique for each data field and for each transmitting of a message.

10. A non-transitory computer-readable medium including a computer program comprising software instructions which, when executed by a computer, implement a method according to claim 9.

* * * * *